US009592688B2

(12) United States Patent
Ono et al.

(10) Patent No.: US 9,592,688 B2
(45) Date of Patent: Mar. 14, 2017

(54) DISPLAY DEVICE AND IMAGE FORMING APPARATUS

(75) Inventors: Akehiro Ono, Nagoya (JP); Xingjing Chen, Nagoya (JP); Takeo Kojima, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 824 days.

(21) Appl. No.: 13/597,766

(22) Filed: Aug. 29, 2012

(65) Prior Publication Data

US 2013/0083341 A1 Apr. 4, 2013

(30) Foreign Application Priority Data

Sep. 30, 2011 (JP) ................................ 2011-216847

(51) Int. Cl.
*G02F 1/1335* (2006.01)
*B41J 29/02* (2006.01)
*B41J 3/46* (2006.01)

(52) U.S. Cl.
CPC *B41J 29/02* (2013.01); *B41J 3/46* (2013.01)

(58) Field of Classification Search
CPC ... B41J 29/12; B41J 3/46; G06F 3/041; G06F 1/1601; G06F 1/1637; G02F 1/133308; G02F 1/133608; G02F 1/13338
USPC ...................... 349/12, 58, 149; 345/173, 174
See application file for complete search history.

(56) References Cited

U.S. PATENT DOCUMENTS 6,213,789 B1 * 4/2001 Chua .................... H01L 21/563 257/E21.503
6,532,152 B1 * 3/2003 White ............... G02F 1/133308 312/223.1
7,558,054 B1 * 7/2009 Prest .................... H05K 5/0239 361/679.3
2007/0252922 A1 * 11/2007 Oohira ............. G02F 1/133308 349/58
2008/0007538 A1 * 1/2008 Kotera et al. ................. 345/173

FOREIGN PATENT DOCUMENTS

JP 11-185991 A 7/1999
JP 2004-191782 A 7/2004
JP 2005-209868 A 8/2005
JP 2006-163742 A 6/2006
JP 2008-102173 A 5/2008

OTHER PUBLICATIONS

Jun. 30, 2015—(JP) Notification of Reasons for Rejection—App 2011-216847.

* cited by examiner

*Primary Examiner* — Edward Glick
*Assistant Examiner* — David Chung
(74) *Attorney, Agent, or Firm* — Banner & Witcoff, Ltd.

(57) ABSTRACT

A display device is provided. The display device includes a chassis with an opening, a touch-screen unit, which is arranged to have a first plane thereof toward the opening and is configured to accept an input operation entered through a reactive area in the first plane when the reactive area is touched, a positioning part, which is formed on the chassis and is configured to be in contact with a non-reactive area being different from the reactive area in the touch-screen unit, and a resilient member, which is configured to urge the touch-screen unit against the positioning part.

16 Claims, 8 Drawing Sheets

DISPLAY DEVICE AND IMAGE FORMING APPARATUS

CROSS REFERENCE TO RELATED APPLICATION

This application claims priority from Japanese Patent Application No. 2011-216847, filed on Sep. 30, 2011, the entire subject matter of which is incorporated herein by reference.

BACKGROUND

Technical Field

An aspect of the present invention relates to a display device with a touch-sensitive panel and to an image forming apparatus having the display device.

Related Art

Display devices with touch-screen panels, which provide interfaces between users and electric devices such as home electric appliances, facsimile machines, printers, and portable computers, are known. The user can touch a touch-sensitive surface of the touch-screen panel and enter instructions to the electric device. The display device may include, for example, a liquid crystal panel to display an image, a casing to cover a periphery of an outer surface of the liquid crystal panel, and a resin frame to support an inner side of the liquid crystal panel. Further, a transmissive touch-sensitive panel, which allows the liquid crystal panel to be seen, may be arranged on top of the casing.

SUMMARY

When the electric device is provided with the display device having the touch-screen panel, a chassis of the electric device may be formed to surround an outer periphery of the touch-sensitive range of the touch-screen panel. With the chassis surrounding the touch-screen panel, the resin frame to hold the touch-screen panel from the inner side may be attached to the chassis. However, when the resin frame is attached to the chassis, due to manufacturing inaccuracies, it may be difficult to set the resin frame, the liquid crystal panel, the casing for the liquid crystal panel, and the touch-screen panel in correct positions with respect to one another. In particular, a clearance between the chassis and the touch-screen panel may not be correctly maintained at a preferable amount.

When the clearance is smaller than the preferred amount, and when external force is applied to the chassis and the chassis is deformed inward by the external force, the chassis may contact the touch-screen panel. Such contact may be incorrectly entered as an instruction. On the other hand, when the clearance is larger than the preferred amount, obstacles such as dirt or dust may slip inside the electric device through the clearance and may cause problems in the electric device.

In view of the difficulty, the present invention is advantageous in that a display device and an image forming apparatus, in which the clearance between the chassis and the touch-sensitive panel can be preferably maintained, are provided.

According to an aspect of the present invention, a display device is provided. The display device includes a chassis with an opening, a touch-screen unit, which is arranged to have a first plane thereof toward the opening and is configured to accept an input operation entered through a reactive area in the first plane when the reactive area is touched, a positioning part, which is formed on the chassis and is configured to be in contact with a non-reactive area being different from the reactive area in the touch-screen unit, and a resilient member, which is configured to urge the touch-screen unit against the positioning part.

According to another aspect of the present invention, an image forming apparatus is provided. The image forming apparatus includes an image forming unit and a display device. The display device includes a chassis with an opening, a touch-screen unit, which is arranged to have a first plane thereof toward the opening and is configured to accept an input operation entered through a reactive area in the first plane when the reactive area is touched, a positioning part, which is formed on the chassis and is configured to be in contact with a non-reactive area being different from the reactive area in the touch-screen unit, and a resilient member, which is configured to urge the touch-screen unit against the positioning part. The chassis is formed to have an elongated shape, of which length is greater than a length of the touch-screen unit.

According to another aspect of the present invention, a display device is provided The display device includes a chassis with an opening, a touch-panel which is arranged to have a first plane thereof toward the opening and is configured to accept an input operation entered through a reactive area in the first plane when the reactive area is touched, a frame, which is configured to hold outer rims of the touch-panel, a positioning part, which is formed on the chassis and is configured to be in contact with the frame, and a resilient member, which is configured to urge the frame against the positioning part.

BRIEF DESCRIPTION OF THE ACCOMPANYING DRAWINGS

FIG. 1 a schematic cross-sectional side view of a laser printer according to an embodiment of the present invention.

DETAILED DESCRIPTION

Hereinafter, an embodiment according to an aspect of the present invention will be described with reference to the accompanying drawings. In the following description, firstly, an overall configuration of a laser printer 1 being an image forming apparatus with a display device 100 will be described, and secondly, detailed configuration of the display device 100 will be described.

In the present embodiment, directions concerning the laser printer 1 and the display device 100 will be referred to based on orientations indicated by arrows shown in each drawing. For example, in FIG. 1, a viewer's right-hand side and left-hand side will be referred to as front and rear for the laser printer 1 respectively. Further, the viewer's further side and nearer side will be referred to as right and left for the laser printer 1 respectively. The right-left direction may also be referred to as a widthwise direction, and an up-down direction in FIG. 1 may be referred to as a vertical direction.

Figure 1:
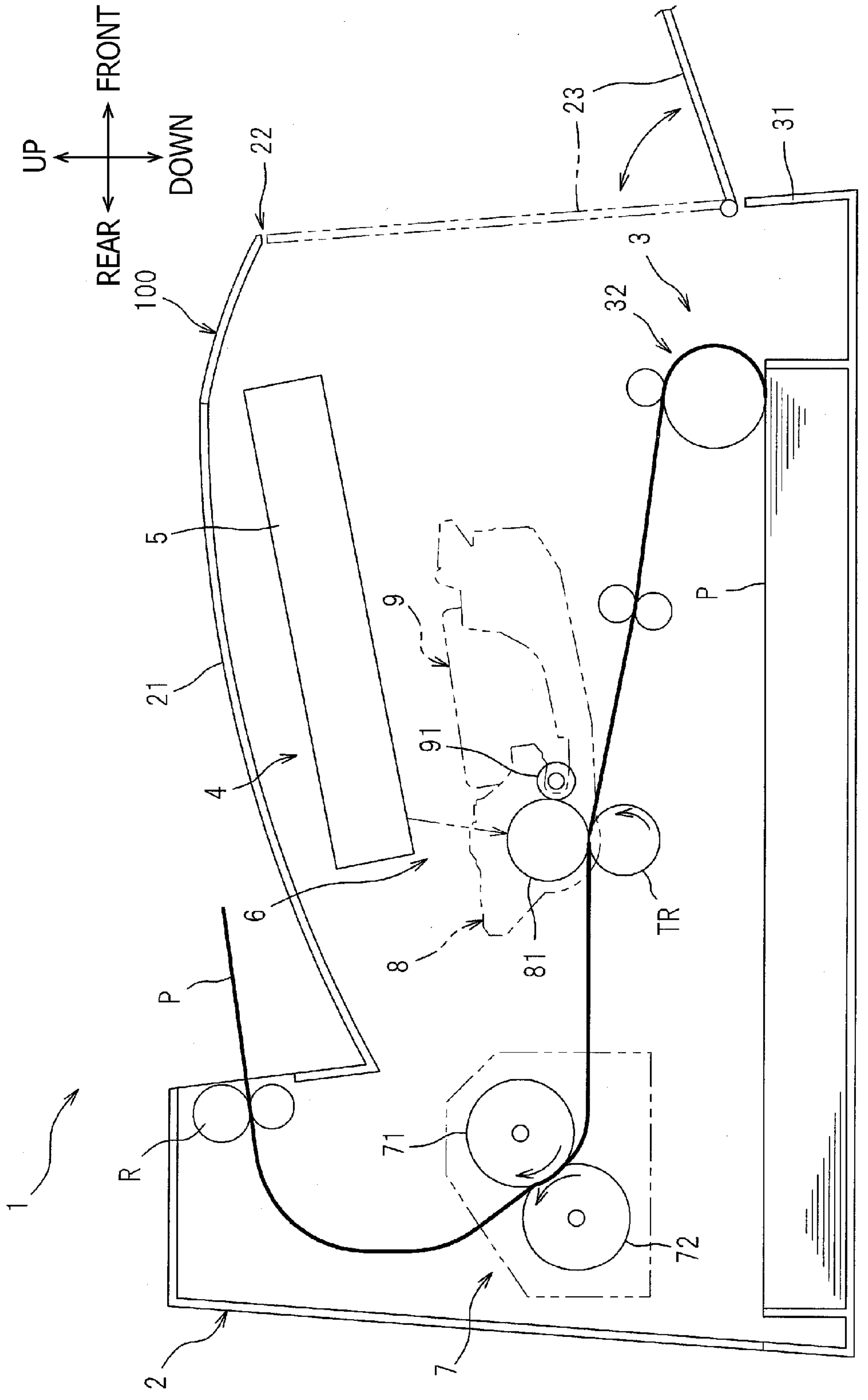

As shown in FIG. 1, the laser printer 1 includes a feeder unit 3, which feeds sheets P of paper to a body 2 in the laser printer 1, and an image forming unit 4, which forms images on the sheets P having been fed. The feeder unit 3 includes a sheet-feed tray 31, which is to store the sheets P therein and is removably installed in a lower position with respect to the body 2 in the laser printer 1. The feeder unit 3 further includes a feeder system 32, which conveys the sheets P from the sheet-feed tray 31 to the image forming unit 4. The image forming unit 4 includes a scanner unit 5, a processing cartridge 6, a transfer roller TR, and a fixing unit 7.

The scanner unit 5 is arranged in an upper position in the body 2 of the laser printer 1 and includes a laser emitter, a polygon mirror, lenses, and reflection mirrors, which are not shown. The scanner unit 5 emits a laser beam to scan a circumferential surface of a photosensitive drum 81.

The processing cartridge 6 is detachably attached to the body 2 of the laser printer 1 and can be installed through an opening 22, which is formed on a front face of the body 2. The opening 22 is covered or uncovered by a front cover 23, which is pivotable about one edge thereof to rotate with respect to the front face of the body 2. The processing cartridge 6 includes a drum cartridge 8 and a developer cartridge 9, which is detachably attached to the drum cartridge 8. The drum cartridge 8 includes the photosensitive drum 81, on which a latent image is formed, and a charger (not shown), which is in a known configuration. The developer cartridge 9 includes a developer roller 91, which contains toner being a developer agent therein and supplies the toner to the photosensitive drum 81, and other known components such as a supplier roller, toner-spreading blade, and an agitator, which are not shown.

In the processing cartridge 6, the circumferential surface of the photosensitive drum 81 is evenly charged by the charger whilst the photosensitive drum 81 is rotated and is exposed to the laser beam emitted from the scanner unit 5. The area exposed the laser beam on the surface of the photosensitive drum 81 has lower potentials than the unexposed area, and the lower-potential area forms a latent image on the surface of the photosensitive drum 81.

Meanwhile, the developer roller 91 rotates, and the toner in the developer cartridge 9 is supplied to the latent image formed on the photosensitive drum 81. Thus, the latent image is developed to form a toner image on the surface of the photosensitive drum 81. The toner image is thereafter transferred onto the sheet P whilst the sheet P being carried passes the intermediate position between the photosensitive drum 81 and the transfer roller TR.

The transferred toner image is fixed thereat on the sheet P in the fixing unit 7. The fixing unit 7 includes a heat roller 71 and a pressure roller 72. The pressure roller 72 is arranged to face the heat roller 71 and to press the heat roller 71. Whilst the sheet P is carried in the intermediate position between the heat roller 71 and the pressure roller 72, the transferred toner image is thermally fixed thereat.

The sheet P with the fixed image is carried to a discharge roller R, which is arranged in a downstream position with respect to the fixing unit 7 along a flow of sheet conveyance, and is discharged by the discharge roller R out of the body 2 to be released in a discharge tray 21.

Next, a display device 100 provided in the laser printer 1 will be described. The display device 100 displays images, such as icons, which represent various types of information to be presented to the user, and is arranged on a top front side of the body 2. The display device 100 is formed in a shape of an elongated rectangle and is arranged to have longitudinal edges thereof to be aligned along the widthwise (right-left) direction, and the shorter edges of the display device 100 to be angled with respect to the front-rear direction (see FIG. 1).

Figure 2:
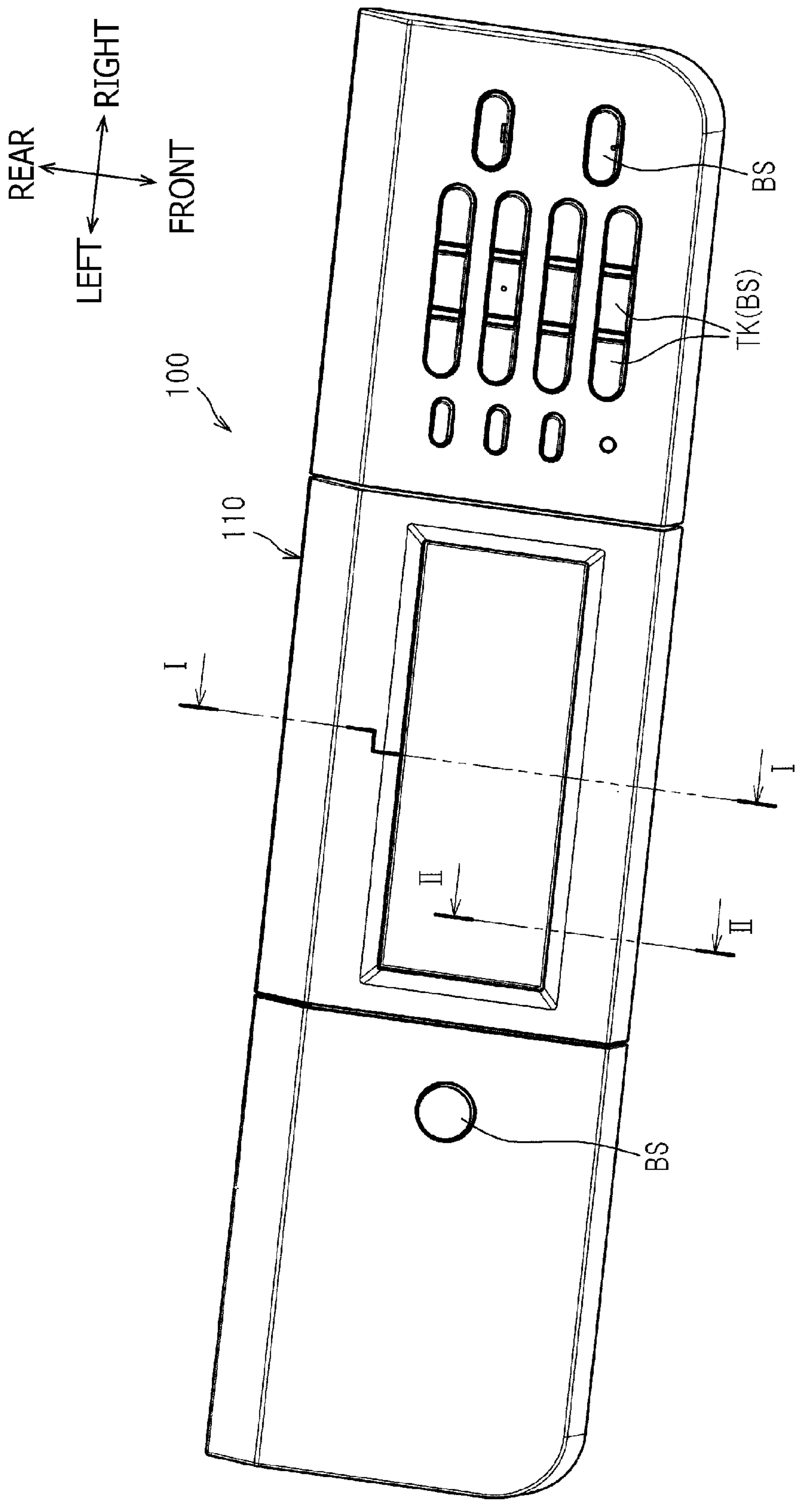
FIG. 2 is a perspective view of a display device according to the embodiment of the present invention.
Figure 3:
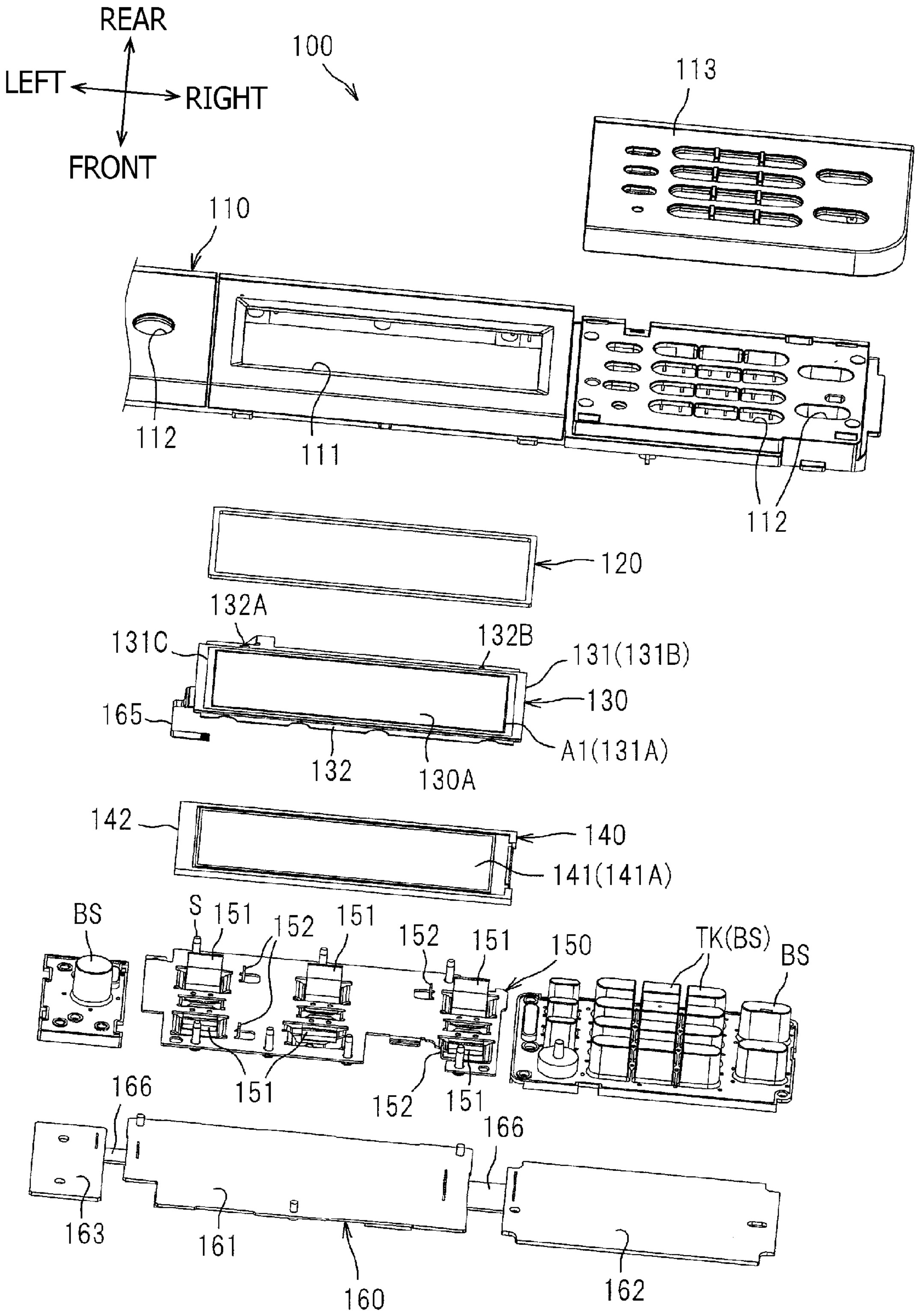
FIG. 3 is an exploded view of the display device from above according to the embodiment of the present invention.

As shown in FIGS. 2 and 3, the display device 100 includes a resin frame 110, a sealer 120, a touch-screen unit 130, a liquid crystal unit 140, a shield member 50, and a substrate 160.

The resin frame 110 is formed in a shape of an elongated flat plate, of which longitudinal edges are longer than longitudinal edges of the touch-screen unit 130. The resin frame 110 is formed to have an opening 111, through which a part of an outer surface 130A of the touch-screen unit 130 is exposed, in a widthwise central position thereof. The opening 111 is formed in a shape of a rectangle, of which longer edges are aligned along the widthwise direction.

On a right-hand part and a left-hand part with respect to the opening 111 in the resin frame 110, a plurality of holes 112 are formed, and keys (e.g., numerical keys TK) and buttons (e.g., a button switch BS) are exposed through the holes 112. The right-hand part of the resin frame 110, in which the holes 112 for the numerical keys TK are formed, is formed on a plane which is lower than the remainder of the resin frame 110, and a cover 113 is placed over the lowered right-hand part.

Figure 4:
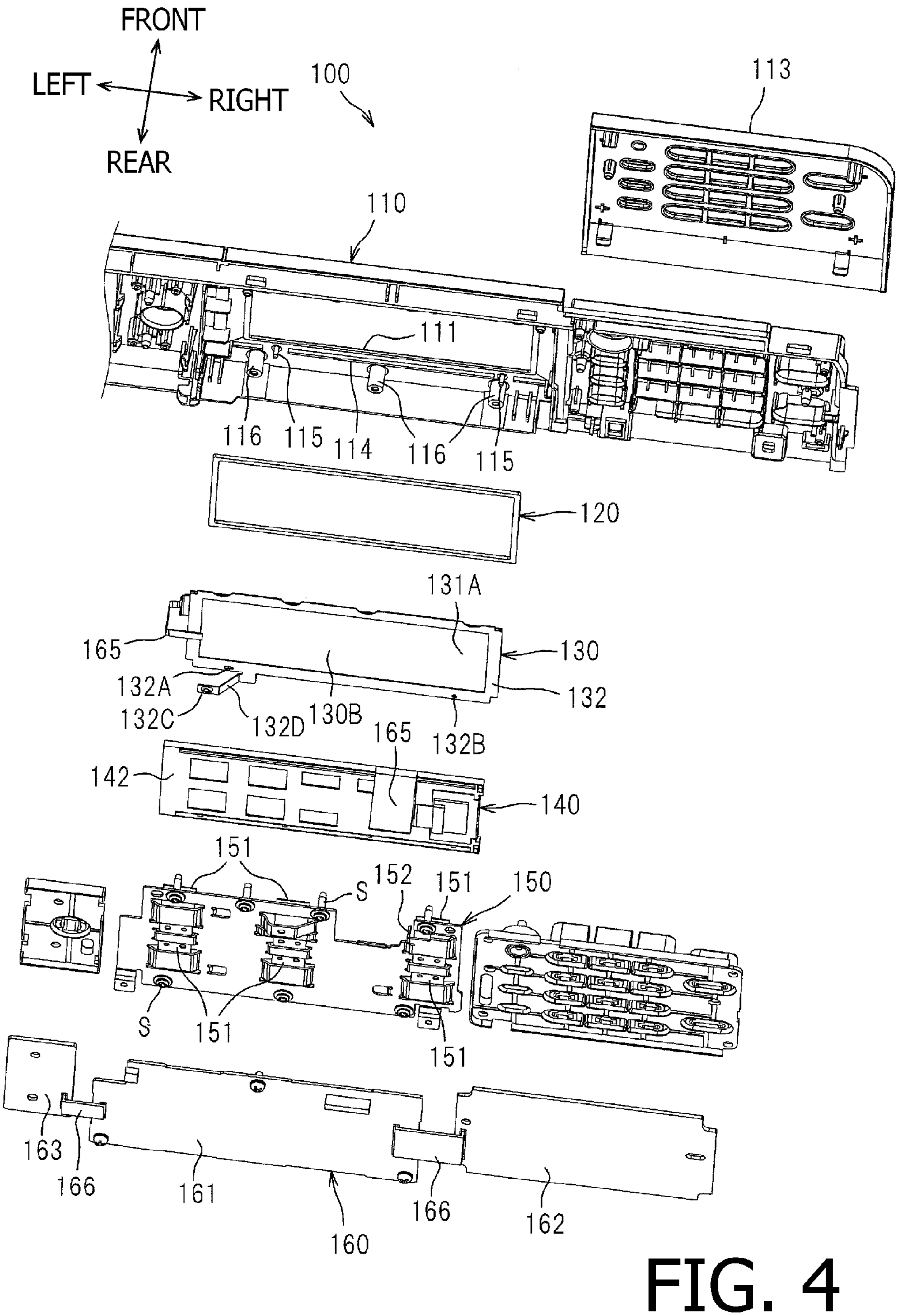
FIG. 4 is an exploded view of the display device from below according to the embodiment of the present invention.
Figure 5:
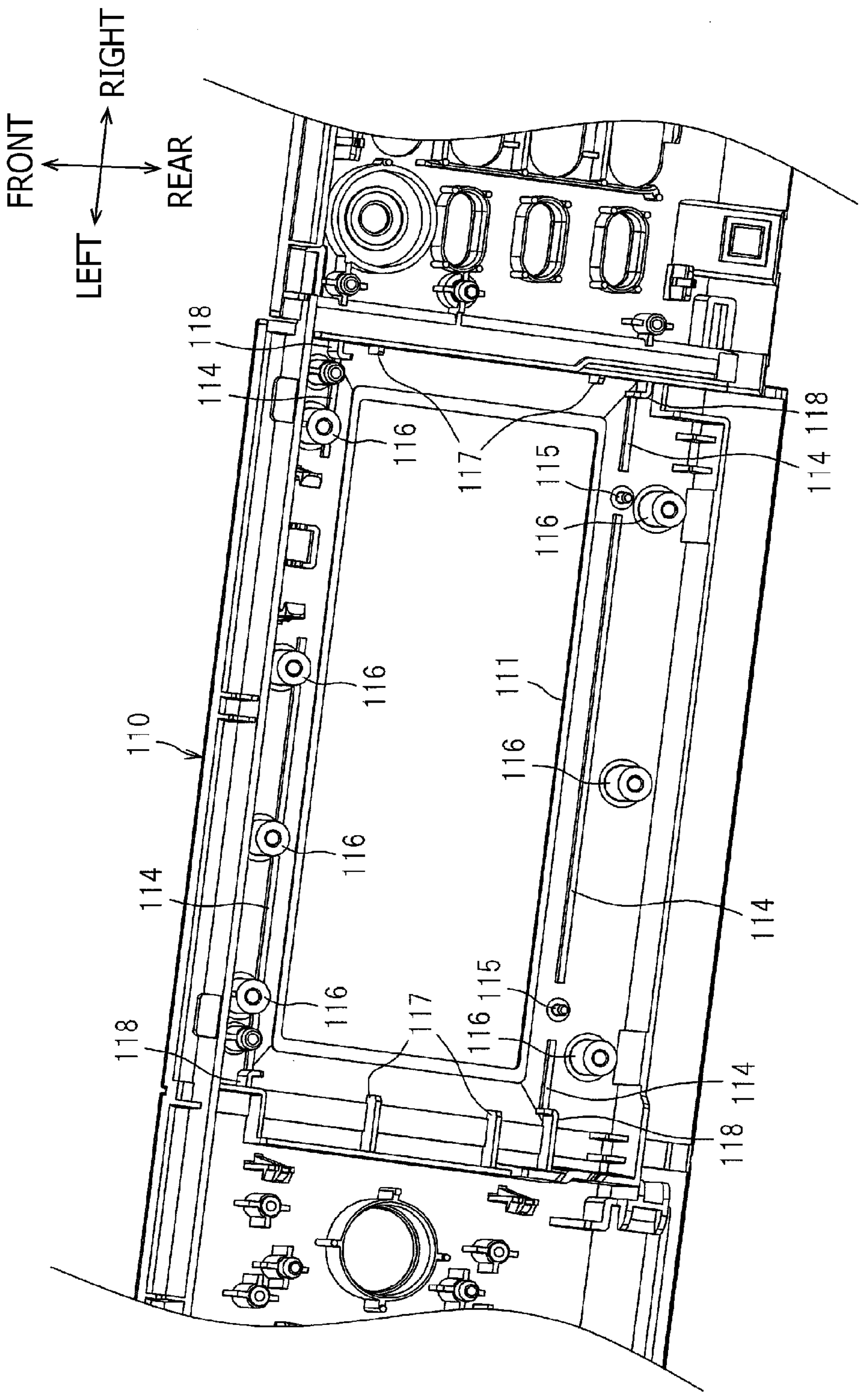
FIG. 5 is a perspective view of a resin frame of the display device according to the embodiment of the present invention viewed from an inner side.

The resin frame 110 is further formed to have positioning ribs 114 on an inner side thereof (see FIGS. 4 and 5). The positioning ribs 114 become in contact with non-reactive areas, which are other than a reactive area A1 (see FIG. 3), in the touch-screen unit 130 when the touch-screen unit 130 is attached to the resin frame 110 and serve to place the touch-screen unit 130 in a correct position with respect to the resin frame 110. Each positioning rib 114 is formed to protrude from an inner plane of the resin frame 110 toward the touch-screen unit 130. Further, each positioning rib 114 is formed in a separate position apart from a rim of the opening 111 and linearly extends in a direction along the rim of the opening 111.

More specifically, the positioning ribs 114 are formed on each (front or rear) side of the opening 111 with reference to the direction of shorter rims of the opening 111 to extend along the longitudinal rims (i.e., along the widthwise direction), and a plurality of positioning ribs 114 are formed in spaced apart positions from each other along the longitudinal rim of the opening 111. In positions between the positioning ribs 114 which are arranged on the rear side of the opening 111 on the inner plane of the resin frame 110, a plurality of positioning projections 115 are formed. The positioning projections 115 are engageable with positioning holes 132A, 132B (see FIG. 4) of a metal frame 132 and serve to place the touch-screen unit 130 in a correct planar position with respect to the front-rear direction and the widthwise direction.

Against the positioning ribs 114, the non-reactive area of the touch-screen unit 130 is resiliently urged by blade springs 151, and the outer surface 130A of the touch-screen unit 130 can be placed in the correct position with respect to the resin frame 110. Thus, clearance between the resin frame 110 and the touch-screen unit 130 may be maintained at a correct amount. Therefore, ingress of obstacles through the clearance between the resin frame 110 and the touch-screen unit 130, which may otherwise occur when the clearance is larger than the correct amount, may be prevented. Meanwhile, unintentional contact of the resin frame 110 with the reactive area A1 of the touch-screen unit 130, which may otherwise occur when the clearance is smaller than the correct amount, may be prevented.

The sealer 120 (see FIGS. 3 and 5) is made of, for example, rubber and is formed to have a shape of rectangular open frame to surround the opening 111. The sealer 120 serves to fill the clearance between the resin frame 110 and the non-reactive area of the touch-screen unit 130. In particular, the sealer 120 is arranged in a position between the positioning ribs 114 and the rims of the opening 111. With the sealer 120 arranged in the position, ingress of the obstacles, such as dust or water, through the clearance between the resin frame 110 and the touch-screen unit 130 can be reduced or restricted (see also FIG. 6).

The touch-screen unit 130 provides a user interface between the laser printer 1 and a user, and the user can touch the reactive area A1 in the outer surface 130A of the touch-screen unit 130 to input instructions and information concerning an image forming operation to the laser printer 1. The touch-screen unit 130 is arranged to have the outer surface 103A exposed through the opening 111 of the resin frame 110. The touch-screen unit 130 includes a touch-panel 131 having a shape of a rectangle, of which longer sides are aligned along the widthwise direction, and a metal frame 132, which holds outer rims of the touch-panel 131.

The touch-panel 131 includes a reactive member 131A having a shape of an elongated rectangle, of which longer sides are aligned along the widthwise direction, a support frame 131B, which holds outer rims of the reactive member 131A, and a protection sheet 131, which covers an outer surface of the reactive member 131A.

The reactive member 131A detects a position being touched and is formed in a larger planar size than a size of the opening 111. The reaction member 131A may be, for example, but not necessarily limited to, a resistive film or a surface acoustic wave filter.

The support frame 131B is formed to have a shape of an open rectangle and supports the reactive member 131A in the open area. The protection sheet 131C is formed to have a larger plane than the plane of the reactive member 131A and is attached over the reactive member 131A and the support frame 131B. Therefore, the plane area in the protection sheet 131 covering the reactive member 131A forms the reactive area A1.

The reactive member 131A and the protection sheet 131C are light-transmissive and thus allow a screen 141A of the liquid crystal unit 140, which is arranged in an underside position of the reactive area A1, to be seen there-through. Therefore, the user can view images such as icons displayed on the screen 141A of the liquid crystal unit 140 and input instructions and information using the icons to manipulate the touch-screen unit 130 simultaneously. The reactive area A1 in the reactive member 131A is in a size which is larger than the opening 111 of the resin frame 110; therefore, through the opening 111, the reactive area A1, which is as large as the entire size of the opening 111, is achieved.

The metal frame 132 is made of a metal and formed to have a shape of an open rectangle. The metal frame 132 is fixed to outer rims of the support frame 131B. On a rear edge of the metal frame 132, positioning holes 132A, 132B are formed. The positioning holes 132A, 132B are engageable with the positioning projections 115, which are formed on the resin frame 110. One of the two positioning holes 132A, 132B (e.g., the positioning hole 132A) is formed to have a shape of an elongated circle, which can absorb linear expansion of the metal frame 132 in the longitudinal (widthwise) direction. The metal frame 123 serves as a part of the non-reactive area of the touch-screen unit 130 and is arranged to be in contact with the positioning ribs 114 (see FIG. 6A).

The metal frame 132 is formed to have an extended claw 132C (see FIG. 4) on the rear edge thereof on the left-hand side. The extended claw 132D extends downward from the rear edge of the metal frame 132 and is formed to have a screw hole 132C in a lower tip thereof. The extended claw 132D is fixed to the resin frame 110 along with the shield member 50 by a screw (not shown) via the screw hole 132C. Thus, a part of the metal frame 132 (i.e., the extended claw 132D) is maintained in contact with the shield member 50, so that static electricity, which may enter through the opening 111, can be introduced to the shield member 50 and prevented from being transmitted to the touch-panel 131 or to a liquid crystal panel 141.

The liquid crystal unit 140 to display images includes the liquid crystal panel 141 and a support frame 142 to hold the liquid crystal panel 141. The liquid crystal panel 141 is formed to have a shape of an elongated rectangle, of which longitudinal edges are aligned along the widthwise direction and includes the screen 141A. The liquid crystal panel 141 is arranged to have the screen 141A to face an inner surface 130B of the touch-screen unit 130. The liquid crystal panel 141 is formed in a plane size which is equivalent to the plane size of the reactive area A1 (i.e., an area defined by the inner rims of the metal frame 132) of the touch-panel 131.

When the reactive area A1 is thus as large as the liquid crystal panel 141, an image displayable area in the screen 141A can be also enlarged to the extent of the opening 111 of the resin frame 110; therefore, larger images (e.g., icons) can be displayed on the screen 141A. In other words, visibility of the images on the screen 141A can be improved.

The support frame 142 is made of resin and formed to have a shape of a closed rectangle, of which longitudinal edges are aligned along the widthwise direction. The support frame 142 is formed in a larger plane size than the plane of the liquid crystal panel 141. The support frame 142 holds the liquid crystal panel 141 on an outer plane thereof and is in contact with the metal frame 132 at outer rims thereof, which extend outward than the liquid crystal panel 141 (see FIG. 6A).

The support frame 142 is set in a predetermined position with respect to the resin frame 110 via ribs 117, 118 (see FIG. 5), which are formed in the resin frame 110. In particular, two ribs 117 are formed on each of the right-hand side and the left-hand side of the opening 111, and two ribs 118 are formed on each of the front side and the rear side of the opening 111. The support frame 142 can be placed in the correct position by having the front, rear, right, and left side rims thereof to be in contact with the ribs 117, 118.

Figure 6A:
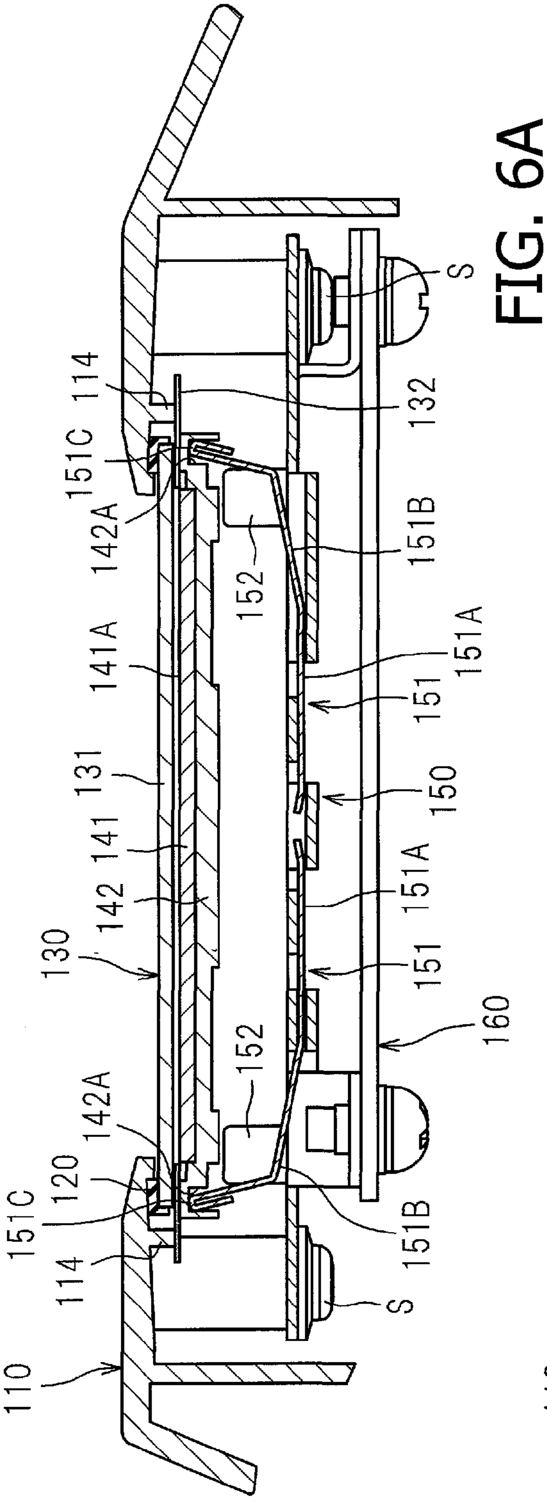
FIG. 6A is a cross-sectional view of the display device according to the embodiment of the present invention taken at a line I-I in FIG. 2.
Figure 6B:
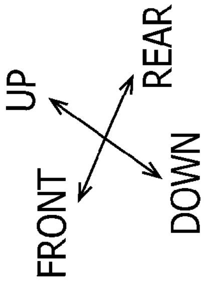
FIG. 6B is a cross-sectional view of the display device according to the embodiment of the present invention taken at a line II-II in FIG. 2.
Figure 6B:
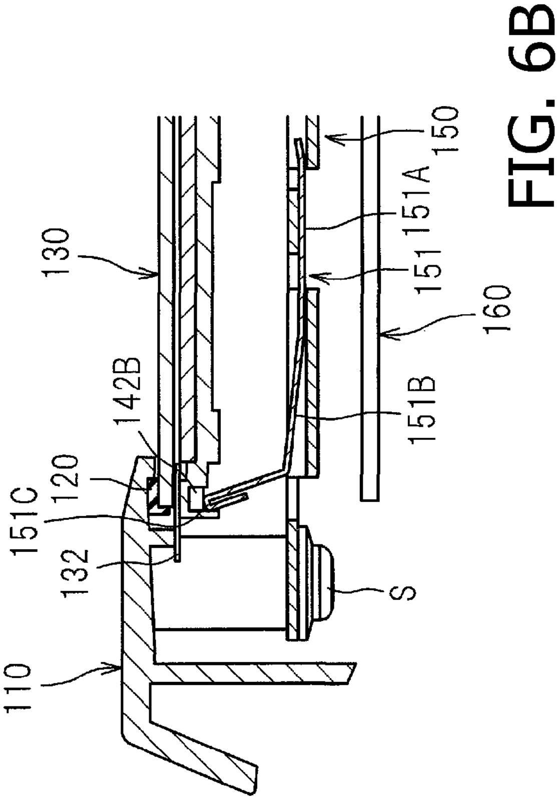

Further, the support frame 142 is in contact with blade springs 151 at areas on the inner surface thereof and is urged against the resin frame 110 by the blade springs 151 (see FIG. 6A). The urging force from the blade springs 151 is thus transmitted to the positioning ribs 114 via the support frame 142 and the metal frame 132. Therefore, it can be prevented that the urging force is transmitted to the touch-panel 131 and to the liquid crystal panel 141, and the touch-panel 131 and the liquid crystal panel 141 can be prevented from being urged directly.

The substrate 160 includes a touch-screen control board 161, a numerical-key board 161, and a button-switch board 163 (see FIGS. 3 and 4). The touch-screen control board 161 is provided with electric devices such as ASIC thereon and is fixed to an underside surface of the shield member 50 by screws (unsigned). The touch-screen control board 161 is connected to the touch-panel 131 and to the liquid crystal panel 141 via a flexible cable 165. Signals generated when the touch-panel 131 is touched are transmitted to the touch-screen control board 161 via the flexible cable 165. The numerical-key board 162 and the button-switch board 163 are arranged in positions underneath the numerical keys TK and the button switch BS respectively and are connected to the touch-screen control board 161 via a flexible cable 166.

The shield member 50 is a metal plate, which can reduce noises generated in the touch-screen unit 130 and the touch-screen control board 161. The shield member 50 covers the liquid crystal unit 140 and the touch-screen unit 130 from the underside of the liquid crystal unit 140, which is the opposite side from the outer surface 130A of the touch-screen unit 130, and is arranged over the surface of the touch-screen control board 161, on which the ASIC is disposed. In other words, the shield member 50 faces the underside of the liquid crystal unit 140 on one side and the touch-screen board 161 on the other side. The shield member 50 is formed in an elongated shape along the widthwise direction and is fixed to the resin frame 110 via a plurality of bosses 116 by a plurality of screws S. Six pieces of blade springs 151 are held on the shield member 50.

Thus, the noises generated in the touch-screen unit 130 and radiation noises from the components (e.g., ASIC) on the touch-screen control board 161 can be reduced by the shield member 50. Further, whilst the noise-reductive shield member 50 holds the blade springs 151, it is not necessary that a specific structure to hold the blade springs 151 is provided. Therefore, a quantity of parts in the display device 100 may be cost-effectively reduced.

Amongst the six pieces of blade springs 151, two pieces of blade springs 151 being a pair are arranged along the direction of the shorter rims of the shield member 50 (i.e., the front-rear direction), one on a side closer to the front and the other on a side closer to the rear, to be spaced apart from each other, and there are three pairs of blade springs 151 arranged along the widthwise direction. Therefore, amongst the three pairs of blade springs 151, two pairs are disposed at widthwise ends of the shield member 50, and the remaining one pair is disposed at an intermediate position between the two pairs at the widthwise ends. In other words, the three pairs of the blade springs 151 are arranged in positions to face widthwise end areas of the support frame 142 and intermediate areas between the widthwise end areas of the support frame 142. In this arrangement, the blade springs 151 urges the support frame 142 at the widthwise end areas and intermediate areas.

Each of the blade springs 151 is formed to have a base part 151A, which extends along the shorter sides of the shield member 50, and a bent part 151B, which is bent toward the support frame 142 (see FIG. 6A). The base part 151A is engaged with the shield member 50, and thus the blade spring 151 is fixed to the shield member 50 at the base part 151A. The bent part 151B includes a tip end 151C, which is in contact with the support frame 142. In particular, the tip end 151C of the blade spring 151 is in contact with a part of the support frame 142, which is on an outer side with respect to the screen 141A of the liquid crystal panel 141. Therefore, when the blade springs 151 urges the support frame 142 at the outer side areas with respect to the screen 141A of the liquid crystal panel 141, it is prevented that the screen 141A bears the urging force from the blade springs 151.

Figure 7:
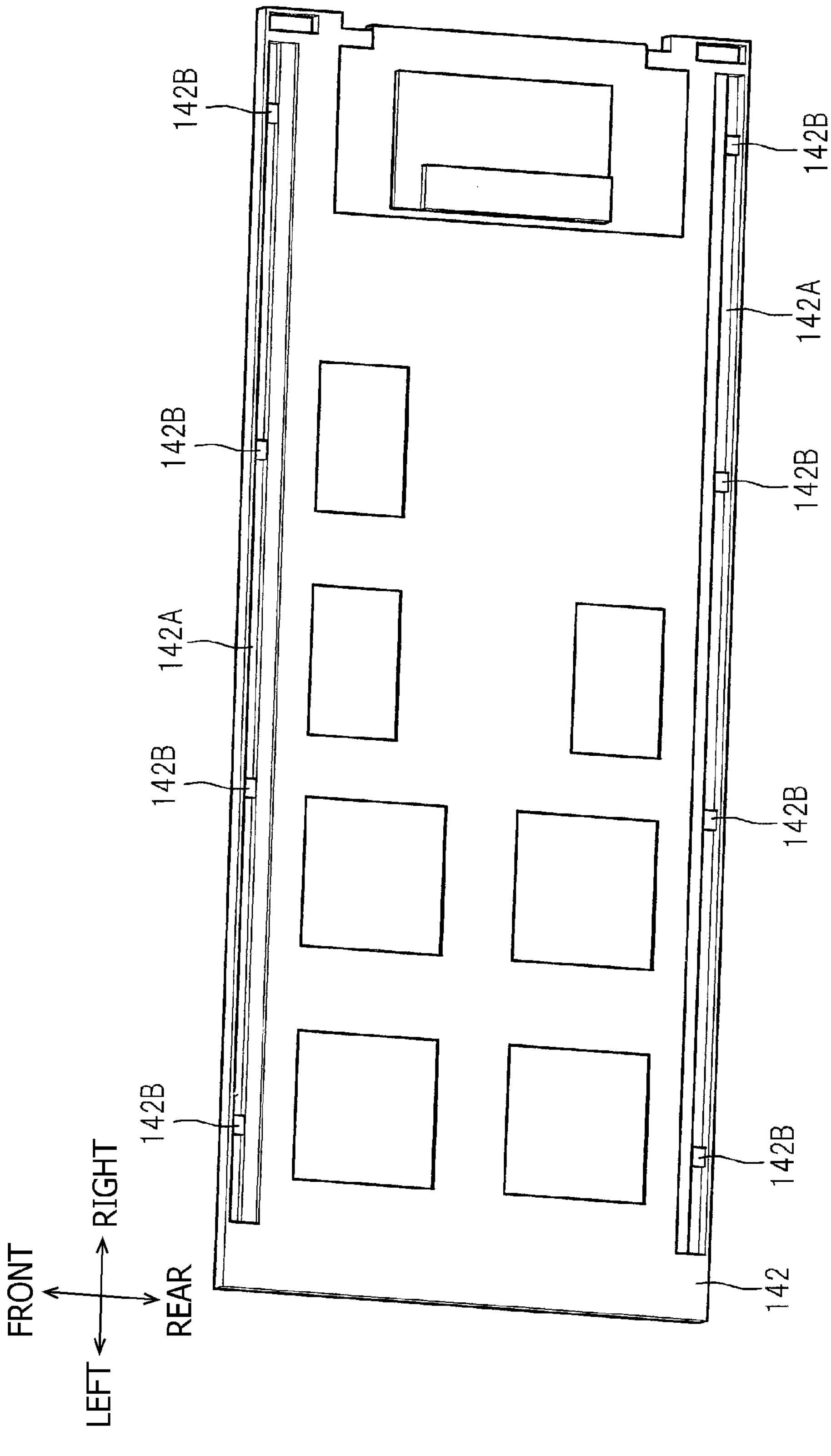
FIG. 7 is a perspective view of a holder frame in the display device according to the embodiment of the present invention viewed from an inner side.
Figure 8:
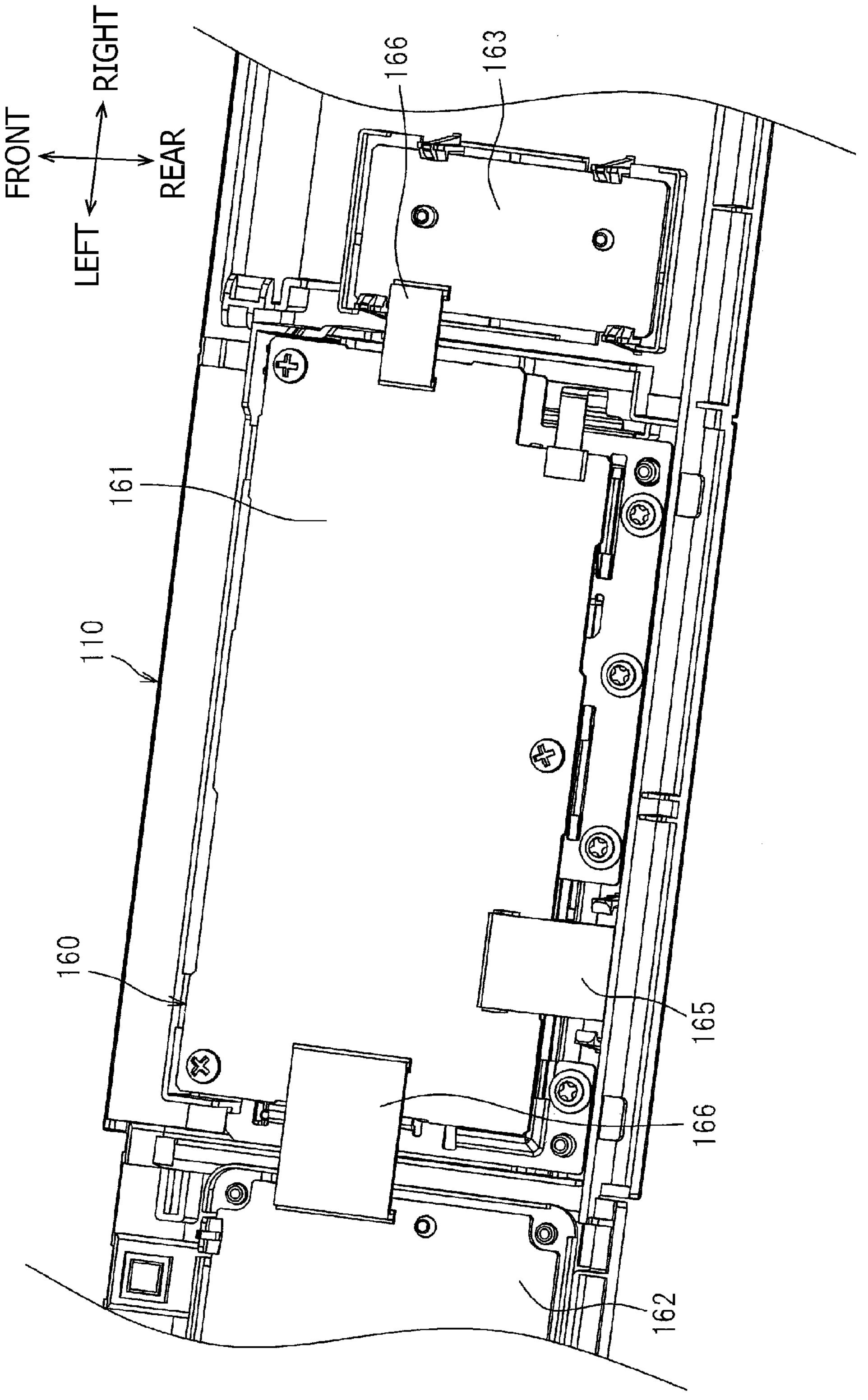
FIG. 8 is a perspective view of the resin frame with an underside cover attached thereto in the display device according to the embodiment of the present invention.

More specifically, the tip end 151C of each blade spring 151 is bent to form a cross-sectional shape of a U, and the bended part is inserted in a groove 142A, which is formed at each end of the shorter rim along the widthwise direction on the underside of the support frame 142. The grooves 142A are formed to range between the widthwise ends of the support frame 142 (see FIG. 7). In each groove 142A, four projections 142B projecting from a depth-end of the groove 142 are formed in spaced-apart positions from one another along the widthwise direction.

The tip ends 151C of the blade springs 151, which are arranged in the intermediate positions on the shield member 50, are placed to be in contact with the depth-end in the grooves 142A, in which no projection 142B is formed (see FIG. 6A). Meanwhile, the tip ends 151C of the blade springs 151, which are arranged in the widthwise end positions on the shield member 50, are placed to be in contact with the projections 142B (see FIG. 6B).

In this arrangement, when the shield member 50 is fixed to the resin frame 110, deformation amount of the blade spring 151 at the widthwise end position and deformation amount of the blade spring 151 at the intermediate position differ from each other. More specifically, the urging force caused by the blade spring 151 at the widthwise end position becomes greater than the urging force caused by the blade spring 151 at the intermediate position. Accordingly, when the touch-panel 131 is pressed at a widthwise end portion, due to the greater urging force from the blade spring 151 at the widthwise end position, the touch-panel 131 can be restricted from being moved from the initial position by the pressure. Thus, the widthwise end areas of the touch-panel 131 can be prevented from being depressed or deformed with respect to the resin frame 110, and it can be prevented that clearance is created or widened between the touch-panel 131 and the resin frame 110.

It is to be noted that, when an end area in the touch-panel 131 is pressed, the urging force from solely the pair of blade springs 151 which are closest to the pressed area tend to react, and the other pairs of blade springs 151 which are further from the pressed area may not react against the pressure. Therefore, when the urging force from the closest pair is not enough, the touch-panel 131 may be deformed by the pressure against the urging force from the blade springs 151. However, according to the above configuration, the depression of the touch-panel 131 may be prevented. Meanwhile, when an intermediate area in the touch-panel 131 is pressed, the urging force from the both widthwise end pairs of blade springs 151 react in addition to the pair of blade springs 151 at the intermediate positions; therefore, the intermediate area in the touch-panel 131 tends to resist the pressure, and the depression at the intermediate area can be prevented.

Further, on the shield member 50, four pieces of stoppers 152 are provided (see FIGS. 3 and 6A). The stoppers 152 are arranged to become in contact with the support frame 142 when the support frame 142 is deformed and restrict the deformation amounts of the blade springs 151. The stoppers 152 are formed by partially cutting out from the shield member 50 and being bent at the uncut parts toward the support frame 142. Two of the stoppers 152 are formed on the left-hand side of the shield member 50 along the front-rear direction to be spaced apart from each other, and one is arranged on the right-hand side of the shield member 50.

With the stoppers 152, depression of the touch-panel 131 due to the pressure from the user can be restricted even more securely.

According to the above-described configuration, the positioning ribs 114 are formed in the positions spaced apart from the rims of the opening 111. Therefore, the reactive area A1 in the touch-screen unit 130 can be enlarged to be larger than the opening 111, and the images can be displayed to the extent of the opening 111.

According to the above-described configuration, the positioning ribs 114 are formed to protrude from the resin frame 110 toward the touch-screen unit 130. Accordingly, a contact surface (an open edge) of each positioning rib 114, which is in contact with the touch-screen unit 130 when the touch-screen unit 130 is installed, can be provided in a preferable planar position more accurately compared to a non-protrusive positioning structure. In other words, positioning accuracy to place the touch-screen unit 130 with respect to the resin frame 110 can be improved.

According to the above-described configuration, the positioning ribs 114 are formed to extend along the rims of the opening 111. Therefore, rigidity of the rims of the opening 111 can be improved by the positioning ribs 114.

The resin frame 110 in the widthwise-elongated shape may be deformed by external pressure rather easily. However, according to the above-described configuration, the touch-screen unit 130 is movably held by the blade springs 151 to absorb the deformation of the resin frame 110. Therefore, it can be restricted that the touch-screen unit 110 is deformed along with the resin frame 130.

According to the above-described configuration, the positioning ribs 114 are formed on each side of the opening 111 with reference to the direction of shorter rims of the opening 111 to extend along the longitudinal rims, and a plurality of positioning ribs 114 are formed in spaced apart positions from each other along each longitudinal rim of the opening 111. Therefore, load of the touch-screen unit 130 may be distributed in the lengthwise ranges in the positioning ribs 114, and the touch-screen unit 130 may be held in steady balance. Accordingly, the touch-screen unit 130 may be prevented from being deformed by the urging force from the blade springs 151.

According to the above-described configuration, the pairs of blade springs 151, which are at the widthwise ends and the intermediate position on the shield member 50, are arranged to be in contact with the different-shaped parts (i.e., the depth-end of the grooves 142A and the projections 142B) in the support frame 142. Therefore, the urging force caused by the blade springs 151 can vary depending on the positions of the blade springs 151. In other words, the identically-manufactured blade springs 151 can produce different intensity of urging force. Thus, cost for manufacturing the blade springs 151 can be reduced compared to cost for manufacturing blade springs of different intensities.

According to the above-described configuration, the outer rims of the support frame 131B are held by the metal frame 132. Therefore, the static electricity entering the resin frame 110 through the opening 111 may be released to the shield member 50 through the metal frame 132. Thus, the liquid crystal panel 141 and the touch-panel 131 can be prevented from being damaged by the static electricity.

Although an example of carrying out the invention has been described, those skilled in the art will appreciate that there are numerous variations and permutations of the display device or the image forming apparatus that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the touch-screen unit 130 (or the metal frame 132) may not necessarily be urged against the positioning ribs 114 by the blade springs 151 indirectly via the support frame 142 but may be directly urged by resilient members. When the touch-screen unit 130 is urged directly by the resilient members, however, it may be necessary that the support frame is held by a structure which is different from the touch-screen unit 130. Therefore, it is concerned that the positional relation between the image displayable area (e.g., the screen 141A in the liquid crystal unit 141) and the touch-screen unit 130 may not be maintained correctly. On the other hand, with the configuration described in the above embodiment, the liquid crystal unit 140 and the touch-screen unit 130 can be maintained in the preferable positions with respect to each other.

When the touch-screen unit 130 is configured to be urged indirectly via the support frame, it may not necessary that the support frame 142 contacts the metal frame 132 in the touch-screen unit 130. For example, the metal frame 132 may be omitted, and the support frame may be directly in contact with the touch-panel. In this regard, the non-reactive area in the touch-panel may be in contact with positioning structure to place the touch-panel in the correct position with respect to the resin frame 110.

For another example, the stoppers 152 may not necessarily be placed to be in contact with the support frame 142 but may be placed to be in contact with, for example, the touch-screen unit (e.g., the touch-screen unit 130) or the resilient members (e.g., the blade springs 151).

For another example, the stoppers 152 or the blade springs 151 may not necessarily be arranged on the shield member 50. For example, the stoppers 152 may be arranged on the touch-screen control board 161. For another example, when a chassis (e.g., the resin frame 110) is extended to the underside of the support frame 142, the stoppers 152 may be arranged on the chassis.

For another example, the positioning members (e.g., the positioning ribs 114) may not necessarily be the linearly-formed ribs but may be, for example, protrusive pins.

For another example, the resilient member (e.g., the blade springs 151) may be replaced with linear springs, torsion springs, or coil springs.

For another example, the display device 100 according to the present invention may not necessarily be applied to the laser printer 1 but may be applied to, for example, an image forming apparatus other than the laser printer 1 (e.g., a copier or a multifunction device), a home electric appliance, a facsimile machine, and a portable computer.

For another example, the liquid crystal panel 141 to display images may be replaced with an organic EL display.

For another example, the blade springs 151 may not necessarily be in the identically-formed pieces but may be formed in different materials or shapes in order to produce urging force of different intensities between the blade springs at the widthwise ends and the intermediate positions. Further, a quantity of the blade springs 151 may not necessarily be six as long as deformation of the touch-screen unit 130 can be restricted.

What is claimed is:

1. A display device, comprising:

a chassis with an opening;

a touch-screen unit comprising a touch-panel and a metal frame, the touch-panel having a first plane facing the opening of the chassis and a second plane facing in an opposite direction to the first plane, the touch-panel being configured to accept an input operation through a reactive area in the first plane when the reactive area is touched, wherein a plane of the metal frame faces in a direction toward both of the first and second planes of the touch-panel, the metal frame being configured to contact outer rims of the touch-panel, wherein the metal frame is not fixed to the chassis;

an image display unit configured to display an image in the reactive area;

a support frame formed of resin and configured to hold the image display unit;

a positioning part, which extends inside the chassis toward the metal frame, configured to contact the plane of the metal frame that faces the touch-panel; and a spring configured to urge the metal frame against the positioning part, wherein the spring contacts the support frame at a position where the metal frame and support frame overlap one another in a direction perpendicular to the first and second planes of the touch-panel.

2. The display device according to claim 1, wherein the positioning part is arranged in a position spaced apart from a rim of the opening.

3. The display device according to claim 2, further comprising:

a sealer configured to fill clearance between the chassis and a non-reactive area in the touch-screen unit in a position between the positioning part and the rim of the opening.

4. The display device according to claim 1, wherein the positioning part is contacted with the first plane.

5. The display device according to claim 1, wherein the positioning part is formed in a shape of a rib, which extends along the rim of the opening.

6. The display device according to claim 1, wherein the image display unit is arranged to face the second plane of the touch-panel.

7. The display device according to claim 6, wherein the metal frame and the support frame are in contact with each other.

8. The display device according to claim 6, wherein the support frame has portions which are disposed at outer side areas of a screen of the image display unit when the support frame is installed in the display device to hold the image display unit, and wherein the spring includes a plurality of springs, which are arranged to urge the outer side areas.

9. The display device according to claim 8, wherein the plurality of springs are arranged in end positions on the support frame and in an intermediate position between the end positions on the support frame; and wherein urging force produced by the springs at the end positions is greater than urging force produced by the spring at the intermediate position.

10. The display device according to claim 9, wherein the support frame projects toward the springs at the end positions with respect to the intermediate position.

11. The display device according to claim 6, further comprising:

a stopper, which is configured to be in contact with one of the support frame and the spring and is configured to restrict an amount of deformation of the spring.

12. The display device according to claim 1, further comprising:

a metal-planar shield member configured to cover the touch-screen unit on a side opposite from the first plane of the touch-screen unit, wherein the shield member is fixed to the chassis with the spring holding thereon.

13. The display device according to claim 8, wherein the plurality of springs are arranged in end positions on the touch-screen unit and in an intermediate position between the end positions on the touch-screen unit; and wherein urging force produced by the springs at the end positions is greater than urging force produced by the spring at the intermediate position.

14. An image forming apparatus, comprising:

an image forming unit; and a display device comprising:

a chassis with an opening;

a touch-screen unit comprising a touch-panel and a metal frame, the touch-panel having a first plane facing the opening of the chassis and a second plane facing in an opposite direction to the first plane, is the touch-panel being configured to accept an input operation through a reactive area in the first plane when the reactive area is touched, wherein a plane of the metal frame faces in a direction toward both of the first and second planes of the touch-panel, the metal frame being configured to contact outer rims of the touch-panel, wherein the metal frame is not fixed to the chassis;

an image display unit configured to display an image in the reactive area;

a support frame formed of resin and configured to hold the image display unit;

a positioning part, which extends inside the chassis toward the metal frame, configured to contact the plane of the metal frame that faces the touch-panel; and a spring configured to urge the metal frame against the positioning part, wherein the spring contacts the support frame at a position where the metal frame and support frame overlap one another in a direction perpendicular to the first and second planes of the touch-panel wherein the chassis is formed to have an elongated shape, wherein a length of the chassis is greater than a length of the touch-screen unit.

15. The display device according to claim 1, wherein metal frame includes a positioning hole and the chassis includes a protrusion, and wherein the protrusion of the chassis is configured to extend through the positioning hole of the metal frame to movably support the metal frame.

16. The display device according to claim 1, wherein the chassis further includes a rib configured to contact and position a support frame of the touch-panel in a direction parallel to the first plane.

* * * * *